United States Patent [19]

Hill

[11] Patent Number: 4,642,191

[45] Date of Patent: Feb. 10, 1987

[54] MULTI-ZONE FLOW CONTROL METHOD AND APPARATUS

[75] Inventor: Robert C. Hill, Santa Clara, Calif.

[73] Assignee: Atlantic Richfield Company, Los Angeles, Calif.

[21] Appl. No.: 550,051

[22] Filed: Nov. 9, 1983

Related U.S. Application Data

[63] Continuation of Ser. No. 357,373, Mar. 12, 1982, abandoned.

[51] Int. Cl.[4] ............................................. B01D 21/24
[52] U.S. Cl. .............................. 210/532.1; 210/537; 210/540
[58] Field of Search ............................. 210/200–202, 210/242.1, 248, 253, 256, 261, 262, 532.1, 536, 537, 540

[56] References Cited

U.S. PATENT DOCUMENTS

| | | | |
|---|---|---|---|
| 289,877 | 12/1883 | Wilson | 210/540 X |
| 738,329 | 9/1903 | Holderman | 210/253 |
| 1,431,367 | 10/1922 | Buchi | 210/532.1 X |
| 2,597,728 | 5/1952 | Hink | 210/242.1 X |
| 2,670,848 | 3/1954 | van Houten et al. | 210/540 X |
| 3,221,889 | 12/1965 | Hirsch | 210/532.1 |
| 3,447,688 | 6/1969 | MacCabe | 210/540 X |
| 3,613,889 | 10/1971 | Reed | 210/540 X |
| 4,028,249 | 6/1977 | McGivern | 210/242.1 |
| 4,154,685 | 5/1979 | Marcotte | 210/262 X |
| 4,305,819 | 12/1981 | Kobozev et al. | 210/540 X |

Primary Examiner—Robert Spitzer
Attorney, Agent, or Firm—Robert M. Betz

[57] ABSTRACT

A plurality of similar open-ended fluid conduits are interconnected between a like number of fluid volume zones within a fluid-filled vessel, such as a clarifier, having a steady upflowing fluid supply, and a small continuously draining collector box adjustably suspended from the top of the vessel and immersed a few inches below the fluid level. The conduits discharge into the collector box through orifices on which a common head is maintained, so as to draw down each fluid zone at the same rate. Thus, the collector box acts as a weir. The conduits are spaced so as to minimize the existence of channeling or lateral currents, which interfere with the most efficient settlement of solid matter. Orifice plates interconnected with the discharge ends of the conduits within the collection box are easily accessible through a hatch in the top of the covered vessel for cleaning, and adjustments.

7 Claims, 4 Drawing Figures

MULTI-ZONE FLOW CONTROL METHOD AND APPARATUS

This application is a continuation of application Ser. No. 357,373, filed Mar. 12, 1983, now abandoned.

BACKGROUND OF THE INVENTION

1. Field of the Invention

This invention pertains generally to the field of fluid flow and more particularly to the field of fluid flow control in wastewater treatment systems.

2. Description of the Prior Art

Typical wastewater treatment systems may include a clarifier tank wherein floatable and settleable solids are removed. The settleable solids tend to sink under the force of gravity and floatables are skimmed off the top. Inflow to such a tank is usually close to the bottom, at which level the water is passed through a stilling well to spread out the flow and produce a smooth, even and slowly rising water current. Outflow from the tank is typically accomplished by means of a weir trough structure surrounding the tank or positioned inward of its sidewall.

Since water will tend to seek the most direct path in the tank between the fluid intake and the outflow weir structure, there will inevitably be some tunneling or channeling currents having a lateral component wherein the rate of flow increases. This in turn tends to produce quiescent or stagnant zones in the tank which are relatively unaffected by influent water. The result is that otherwise settleable solids may be carried within the more rapidly moving channel currents and swept out of the tank while the available dwell time of influent water within the tank is decreased.

This problem is aggravated when the tank, particularly one of large diameter, say 50 feet, experiences tilting such as may occur as the tank settles in use. For example, with V-notch weirs disposed about the periphery of such a tank, a relatively small angle of tilt, by simple geometry, produces a considerable vertical displacement between oppositely positioned V-notches and, thus, a big difference in head. This head imbalance may be great enough to create significantly stronger, non-uniform channeling currents directed toward the lower weirs. A comparable effect may result if some of the V-notch weirs become plugged with surface debris and scum. Part of the problem, of course, lies in the fact that the rate of flow through a V-notch weir is highly sensitive to changes in upstream head. The problem is compounded by the fact that misalignment becomes difficult to detect if the tank is covered. It is also difficult to determine in that event whether particular V-notches are, in fact, plugged. For very large covered tanks, inspection, servicing, and adjustment of perimeter notch-type weirs without draining the tank becomes virtually impossible.

SUMMARY OF THE INVENTION

It is a general object of this invention to provide an improved method and apparatus for controlling fluid discharge from a clarifier stage of a wastewater treatment system.

It is a further object of this invention to provide a method and apparatus for rendering the operation of a clarifier stage of a wastewater treatment system less sensitive to misalignment.

It is yet another object of this invention to provide a method and apparatus for controlling the fluid flow from a clarifier wherein inspection, servicing, and adjustment are facilitated.

It is a more specific object of this invention to provide a method and apparatus for minimizing the formation of non-uniform lateral currents in a clarifier stage of a wastewater treatment system.

In accordance with a preferred embodiment of this invention, an apparatus is described for controlling the fluid discharge from a fluid-filled vessel which comprises a plurality of like fluid collection conduits which are adapted to collect liquid from within the vessel fluid at each of a plurality of spaced apart locations and to conduct separate streams of said fluid into a weir box supported within the vessel. The weir box is a small fluid container provided with a drain, which is at least partially immersed in the fluid of the vessel, the discharge orifices of the conduits being interconnected with the weir box at a common elevation below the vessel fluid level. Means accessible through a hatch in the top of the vessel are provided for adjusting the attitude or height of the weir box so as to maintain the same positive discharge head at the discharge orifices or to increase or decrease such head. Further means are provided for adjusting from within the weir box the size of the discharge orifices and thus the rate of outflow from the vessel. The preferred embodiment of this invention also comprehends the method of controlling the outflow of liquid from a fluid-filled vessel provided with a continuous influent, which comprises collecting fluid in separate streams from each of a plurality of equal volume fluid zones within the vessel, controlling these fluid streams so as to collect liquid from such zones at substantially equal rates and discharging said liquid streams through a like plurality of closely adjacent submerged orifices.

Other objects and advantages of this invention will becomes apparent from a consideration of the detailed description to follow and taken in conjunction with the accompanying drawings and the appended claims.

DESCRIPTION OF THE PREFERRED EMBODIMENTS

Figure 1:
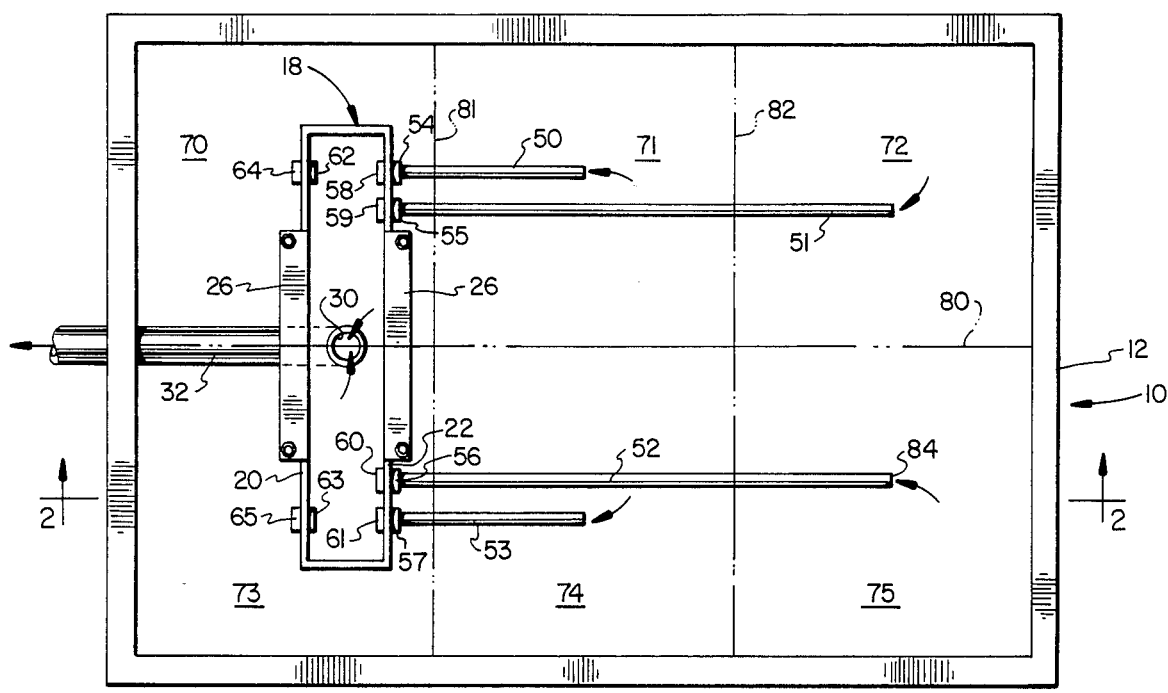
FIG. 1 is a plan view of a fluid-filled vessel, with top removed, in accordance with the preferred embodiment of this invention.
Figure 2:
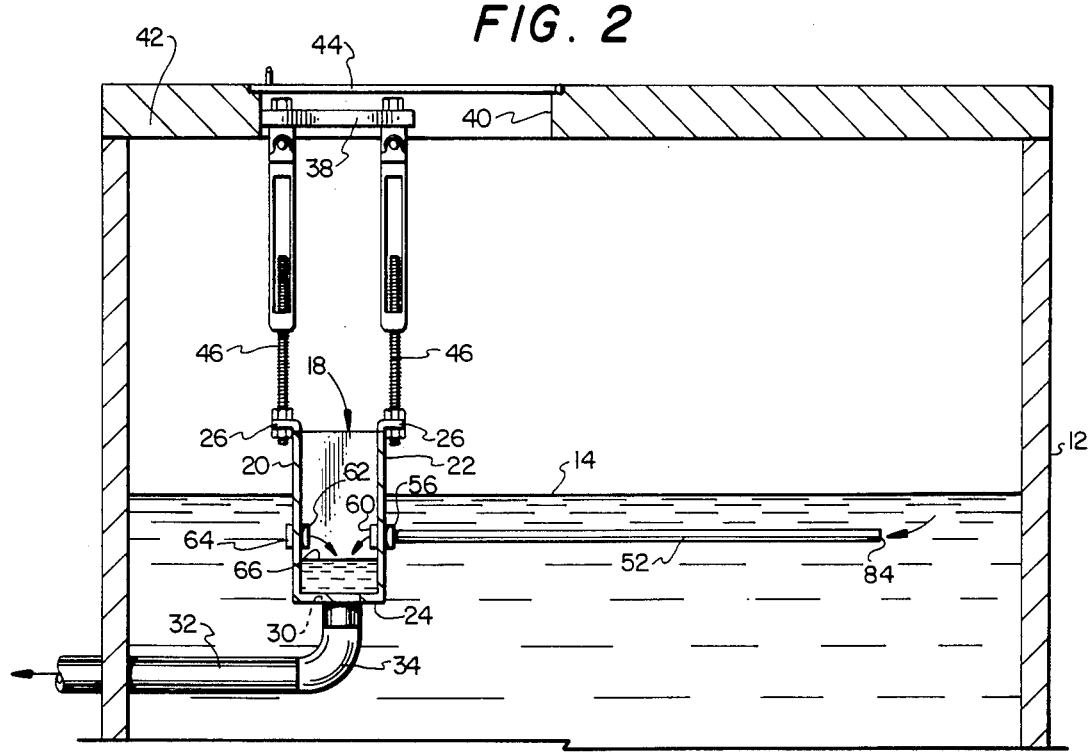
FIG. 2 is a partial vertical section view of the vessel of FIG. 1 taken along the line 2—2 in FIG. 1.

With specific reference now to FIGS. 1 and 2, there is illustrated a tank 10, such as a clarifier stage in a wastewater treatment system, such stage being readily usable, for example, in conjunction with anaerobic biological treatment within the same vessel.

Tank 10 as shown is provided with a rectangular sidewall 12 but within the scope of this invention, the sidewall might readily be circular or in fact any regular or irregular shape. By means not shown, influent is provided to tank 10 at a low level so as to cause water to rise slowly therein to a water level 14. Suspended within the tank 10 and extending a short distance below water level 14 is a fluid container or box 18, which as will be seen, constitutes a form of weir for discharging fluid from vessel 10. Box 18 as shown has a generally rectangular shape with an open top, including a pair of vertical sidewalls 20 and 22, a closed bottom 24 and a top flange 26, but any shape of box is acceptable. The bottom 24 is provided with a drain orifice 30 interconnected with discharge pipe 32 through elbow 34. Box 18 is preferably of small dimensions, for example, 6" wide by 30" long by 6" in height.

Box 18 may be conveniently suspended from support member 38 projecting into aperture 40 within top 42 of tank 10, aperture 40 being accessible by lifting hatch 44. Hanger rods 46 may be fastened at their upper end to support member 38 and at their lower ends to top flange 26 of box 18. It will be understood in this embodiment of the invention that there are four such hanger rods 46 interconnected respectively with the four corners of the top flange 26, only two of such hanger rods being illustrated. By means obvious to those skilled in the art and unnecessary to detail here, such as for example, turn buckles or other threaded elements, the vertical position of each of hanger rods 46 may be adjusted independently of the others. In this manner, the box 18 may be precisely leveled in place, regardless of its possible misalignment with the tank 10 or with a true vertical. By manipulating all hanger rods 46 simultaneously, the box 18 may be raised or lowered. Also, the interior of box 18 is accessible through aperture 40 for adjustments and servicing as will be described.

Extending from box 18 to within the fluid of tank 10 are a series of open-ended collection conduits which as shown include conduits 50, 51, 52 and 53. The aforementioned conduits all are seen to extend from vertical side 22 of box 18. The outlet or discharge ends of such conduits may be threaded into corresponding adapters 54, 55, 56 and 57 mounted on the external side of wall 22, and operably interconnected with corresponding orifice plates 58, 59, 60 and 61 positioned from within the box 18. For reasons that will shortly become apparent, no similar conduits are seen to extend into the fluid of vessel 10 from the parallel vertical wall 20. All that is provided on this side of box 18 are two more threaded adapters 64 and 65 which are interconnected with corresponding orifice plates 62 and 63 which are the functional equivalents of orifice plates 58 through 61. Preferably, the orifices formed by plates 58 through 63 should be less than half the diameter of their respective conduits. The size and length of the conduits should be such that friction losses may be neglected at the rates of fluid flow contemplated. In operation, water is collected at the inlets to conduits 50 through 53, conducted to the submerged orifices in plates 58 through 63 and freely discharged into container 18 under a head determined by the common elevation of such orifices below water level 14. Container 18 is continuously drained to maintain internal downstream water level 66.

In order to understand the orientation of the conduits described, it is convenient to refer to a plurality of equal volume fluid zones 70, 71, 72, 73, 74 and 75 extending from top to bottom of tank 10, which together constitute the entire fluid volume of tank 10. Each zone is understood in horizontal cross section to constitute a square formed by part of sidewall 12 and two or more of the intersecting dashed grid lines 80, 81 and 82.

It can now be seen that conduits 50, 51, 52 and 53 are positioned so that their inlet or collection ends are spaced apart and lie respectively at the approximate centers of zones 71, 72, 74 and 75. The position of orifice plate 62 and 63 on the opposite sidewall 20 of box 18 is such that they lie approximately at the center of zones 70 and 73 respectively, thus eliminating the necessity of separate conduits. It should be apparent that such would not be the case if the position of box 18 relative to the cross sectional area of tank 10 were varied in some other fashion.

The vertical position of the inlet ends of conduits 50 through 53 is not critical and need not be the same for all conduits, except that it should be far enough below the water level 14 to avoid clogging with surface solids and to further avoid interference by vortex action of the water. For example, inlet end 84 of conduit 52, at several inches below level 14, illustrates an acceptable position. By contrast, the outlet or discharge ends of all conduits 50 through 53 through orifice plates 58, 59, 60 and 61 must be maintained at a common elevation below upstream water level 14 and preferably above downstream weir box water level 66. The same elevation should be maintained for orifice plates 60 and 63.

Within the scope of this invention, it is not necessary that the location of orifice plates 58 through 61, 62 and 63 be such as to provide free air discharge into box 18 as shown in FIG. 2. Variance of the size of orifice 30 or of other design parameters of the apparatus may be such as to cause water level 66 to rise sufficiently to cover the orifices formed by plates 58 through 63. All that is required is that a relation of upstream water level 14 and downstream water level 64 is such that a common positive discharge head is maintained on all orifices so that water is drawn down from each zone at the same rate.

By interconnecting collection box 18 with any arbitrary number of spaced apart locations or collection points within the fluid in tank 10, the fluid volume will thereby, in accordance with hydrodynamic principles, be effectively divided into a series of equal volume zones within each of which all water particles flow to a single collection point, i.e. the inlet of a specific conduit. It is a purpose of this invention to position the collection conduits so as to minimize the mean distance of lateral fluid transport within each such zone to each of the inlet ends of the respective conduits with which such zones are associated, and hence to minimize lateral current flow. The ideal cross-sectional area for each zone is a circle. Since this can't be achieved in practice, the closest approximation is usually a square. For example, by positioning inlet end 84 of conduit 52 at the approximate center of the space identifying zone 75, and carrying out a like procedure with all other conduits or their equivalents, the horizontal areas of zones 70 through 75 automatically become approximate squares of equal size. Clearly the greater the number of individual conduits and collection points, the more the lateral fluid transport problem is minimized. It is also advantageous to insure that the maximum lateral fluid transport distance to any inlet is less than the vertical distance from the entry point of the vessel influent to said inlet.

An important advantage of the present invention stems from the fact that the rate of flow through a submerged orifice is much less sensitive to changes in upstream head than V-notch weirs. As is well known, the rate of flow through a submerged orifice is proportional to the one-half power of the upstream head, while the corresponding rate through a V-notch weir is proportional to the five-halves power of head. Even a flat weir is more sensitive in this respect than a submerged orifice. For this reason, if, in operation, the container 18 should tilt from the horizontal, and the submerged orifices formed by orifice plates 58 through 63 experience different fluid heads, the change in rate of fluid flow from each of zones 70 through 75 is minimized. This in turn minimizes the creation of stronger lateral currents favoring any of conduits 50 through 53 or their functional counterparts and inhibiting flow to the others. In general, as the upstream head across a notch or submerged orifice increases, the percentage change in flow through the orifice for a given change in head decreases. But while a notch weir must be narrowed laterally to maintain constant flow rate at increased head, the cross-sectional area of an orifice may be reduced in either of two directions to achieve the same effect, thereby making the orifice less susceptible to plugging. This means that the apparatus of this invention is inherently operable with satisfactory results at a higher head than is possible using a notch type weir for flow control. By making container 18 small, the discharge orifices formed by plates 58 through 63 are made correspondingly close together, so that the vertical separation between orifices, and thus the head variation produced by any given angle of tilt, is relatively small, regardless of the size of vessel 10. However, since even minute deviations in the relative elevation of the various discharge orifices into collector box 18 will cause fluid collection to occur from the fluid zones 70 through 75 at differing rates, with consequent unwanted creation of non-uniform lateral currents, it is nonetheless important to be able to level container 18 rather precisely. The removal of hatch 44 makes hanger rods 46 accessible for this leveling operation. It also makes it a simple matter to visually inspect the interior of container 18 and compare relative fluid flows from the conduits. This also enables one to insert a brush to clean out any clogged conduit, and to replace orifice plates 58 through 63 with others of differing size for different discharge rates. Also, one can vary the discharge rate equally for all zones 70 through 75 by raising or lowering collector box 18. Note also that plugging due to floating scum, which plagues the notch-type weir, is complete eliminated. It is apparent, therefore, that among the advantages of this invention is the ease with which inspection, flow rate adjustment, and servicing of the flow control apparatus may be accomplished. It is also inherently less prone to malfunction than one employing notch-type weirs.

Figure 3:
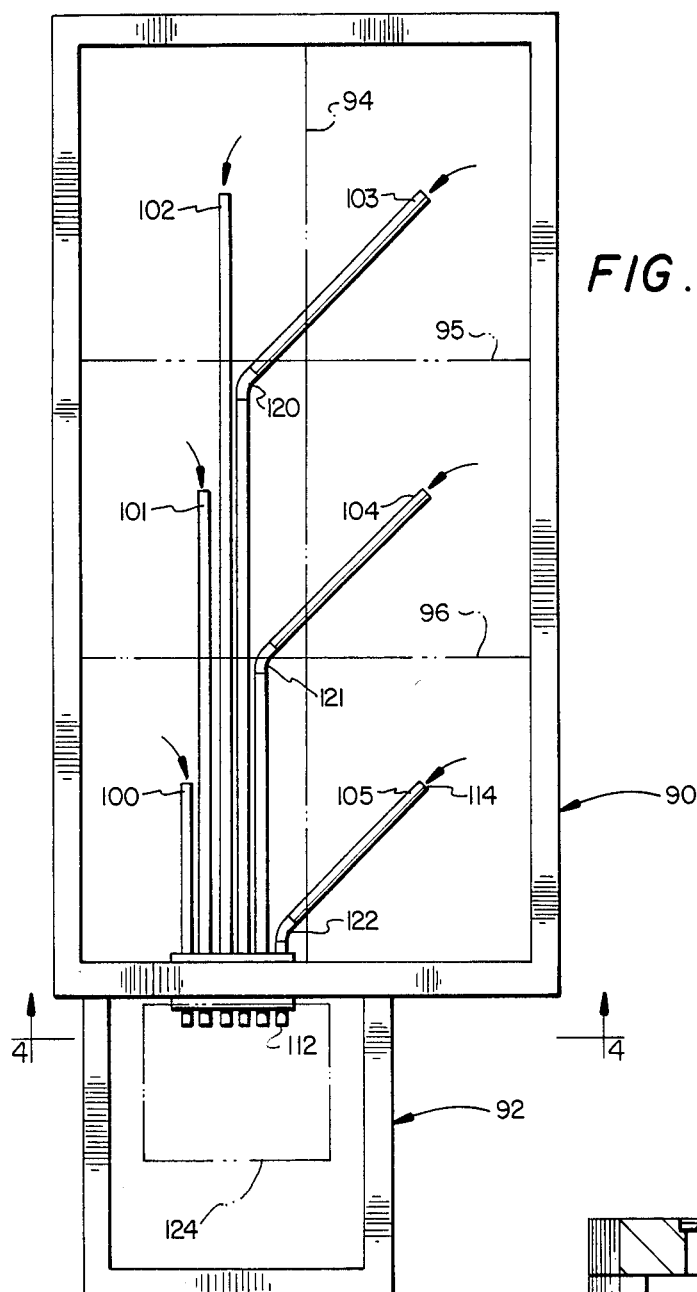
FIG. 3 is a plan view with top removed of a fluid-filled vessel in accordance with an alternate embodiment of this invention.
Figure 4:
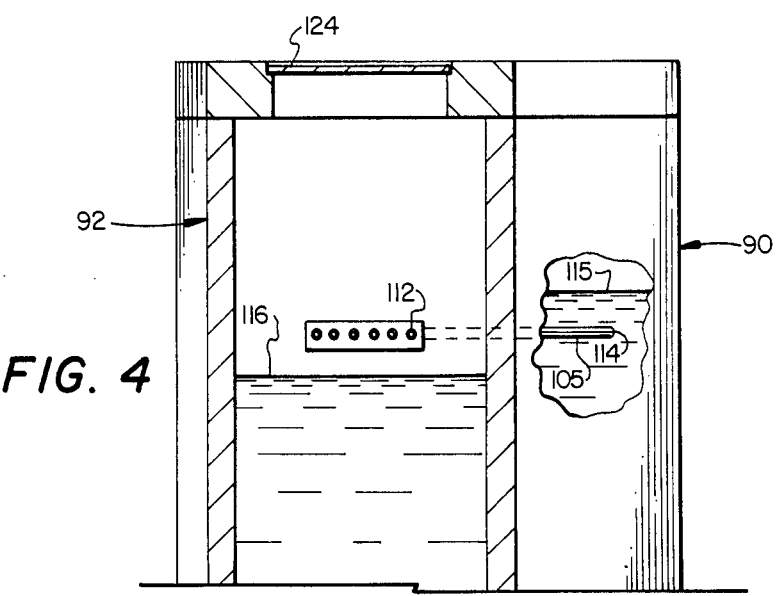
FIG. 4 is a partial vertical section view through the vessel of FIG. 3 taken along the line 4—4 in FIG. 3.

Turning now to FIGS. 3 and 4, in accordance with an alternate embodiment of this invention, there is shown interconnected vessels 90 and 92, which may comprise successive stages in a wastewater treatment plant. In this embodiment of the invention, the collection or weir box 18 previously described has been eliminated in favor of a free discharge from stage 90 into stage 92. In a manner similar to that previously described, the cross sectional area of tank 90 has been divided for reference purposes into six equal rectangular zones by means of dashed grid lines 94, 95 and 96. Fluid collection in separate streams from each of the zones so formed is accomplished by respective positioning of the inlet ends of conduits 100, 101, 102, 103, 104 and 105, which pass through wall 110 of tank 90 and freely discharge onto the water surface in stage 92.

The discharge ends of conduits 100 through 105 such as discharge end 112 all lie at a common elevation below the water level 115 in tank 90 but above the water level 116 in following tank stage 92. Alternatively, the discharge ends of conduits 100 through 105 may lie below the fluid level in stage 92, so long as a positive discharge head is maintained. The inlet end of conduits 100 through 105 such as inlet end 114, shown in dotted outline, are, as in the apparatus of FIGS. 1 and 2, desirably positioned fairly close to but several inches beneath the free surface of water level 115 for the reasons previously explained. As before, the conduits 100 through 105, having effectively divided the fluid volume of vessel 90 into approximately square cross section zones of uniform shape and size, will cause fluid flow to occur in separate streams at equal rates from such zones and hence reduce to a minimum the presence of unwanted lateral currents.

In order to achieve the necessary conduit placement, it will usually be found necessary to have a combination of straight line connections between the inlet and discharge ends of the conduits such as with conduits 100, 101 and 102 and a change in direction as accomplished by means of elbows 120, 121 and 122 inserted midway within conduits 103, 104 and 105 respectively. 45° elbows are commercially available, but more importantly, they make it possible to clean out all conduits from one end to the other by inserting appropriate swabs, brushes or other tools from their discharge ends, which are in turn readily accessible through a hatch 124 in the top (not shown) of stage 92.

The invention as described is not limited to apparatus but also comprehends the method practiced thereby. Such a method includes collecting liquid in separate streams from each of a plurality of equal volume fluid zones within a fluid-filled vessel, controlling these liquid streams so as to collect fluid from these zones at substantially equal rates, and discharging these liquid streams from such vessel through submerged orifices, preferably in close proximity either onto a free surface or in any event, into a container isolated from the fluid in said vessel. A refinement of the method includes collecting liquid so that the formation of such separate streams is effective to create approximately square fluid zones of substantially uniform shape.

The method and apparatus of this invention is also applicable to the mixing of separate fluids in predetermined proportion taken from a plurality of separate fluid containing vessels each maintained at the same fluid level (not shown). It is apparent, for example, that one can easily substitute separate containers for the zones 70 through 75 of FIG. 1. The method then constitutes drawing down the fluid simultaneously from such plurality of vessels in the form of a like plurality of separate streams, collecting and mixing such streams and adjustably limiting the rate of fluid flow in each of the streams so as to mix the content of the source vessels in a predetermined ratio. In this aspect of the invention, the key objective is the desired mixture proportion rather than the control of lateral current flow in any source vessel.

What has been described is illustrative only, and those skilled in the art will have no difficulty in instituting modifications in the configuration and interrelation of component parts of the apparatus or the steps of the method as well as the physical environment thereof, without departing from the scope of this invention as set forth in the appended claims.

What is claimed is:
1. Apparatus for controlling fluid flow comprising:
  (a) a fluid-filled vessel adapted to receive a continuous fluid supply;

(b) a plurality of open-ended cylindrical fluid conduits for collecting fluid from said vessel, the inlet ends of said conduits being submerged within the body of fluid in said vessel at a like plurality of spaced-apart locations, each defining a vertically-extending fluid zone of said vessel, within which all fluid will flow into a respective one of said inlet ends, said fluid zones together constituting said fluid body;

(c) a separate fluid collection container supported within said vessel;

(d) means for fixedly interconnecting the outlet ends of said conduits with said container through separate orifices, said orifices being maintained at a common elevation below the fluid level in said vessel; and (e) means for continuously draining said container.

2. Apparatus as in claim 1 wherein a fluid level is maintained in said collection container below the level of said orifices.

3. Apparatus as in claim 1 additionally including means adjustable from within said container for varying the effective area of any of said orifices, thereby controlling the relative rate of fluid collection by the conduits respectively interconnected therewith.

4. Apparatus as in claim 1 comprising means accessible from the top of said vessel for adjusting the attitude of said container independently of said vessel so as to vary the relative elevation of said orifices.

5. Apparatus as in claim 1 comprising means for varying the vertical elevation of said container relative to the fluid flow in said vessel.

6. A system for mixing separate fluids in predetermined proportions comprising:

(a) a plurality of separate fluid-containing vessels each maintained at the same fluid level;

(b) a like plurality of separate open-ended cylindrical conduits of similar diameter, said conduits being respectively submerged at one end in each of said vessels, the other ends of said conduits being adapted to freely discharge through orifices on which a common head is maintained;

(c) a fluid collection container adapted to receive the discharge from each of said orifices; and (d) means for adjustably limiting the rate of fluid flow through such orifices in predetermined ratio.

7. The method of controlling the outflow of effluent from an upflow settling tank comprising the steps of:

(a) introducing influent continuously at a low level in said settling tank;

(b) collecting effluent from said tank at each of a plurality of spaced-apart collection points above said influent level, said collection points being distributed substantially evenly over the entire horizontal cross-sectional area of the fluid body of said tank so as to create a like plurality of upflow fluid zones within each of which all water particles flow to a respective one of said collection points; and (c) conducting said collected effluent in the form of separate streams to a like plurality of submerged discharge orifices wherein said fluid streams are discharged into a free air environment.

* * * * *